United States Patent [19]

Lermuzeaux

[11] Patent Number: 5,299,426
[45] Date of Patent: Apr. 5, 1994

[54] FREEZING PROCESS AND APPARATUS

[75] Inventor: André Lermuzeaux, Sucy en Brie, France

[73] Assignee: L'Air Liquide, Societe pour l'Etude et l'Exploitation des Proocedes Georges Claude, Paris, France

[21] Appl. No.: 949,248

[22] PCT Filed: Feb. 13, 1992

[86] PCT No.: PCT/FR92/00138
§ 371 Date: Nov. 23, 1992
§ 102(e) Date: Nov. 23, 1992

[87] PCT Pub. No.: WO92/16803
PCT Pub. Date: Oct. 1, 1992

[30] Foreign Application Priority Data

Mar. 21, 1991 [FR] France .................. 91 03430

[51] Int. Cl.⁵ ............................................. F25D 13/06
[52] U.S. Cl. ............................................. 62/63; 62/374
[58] Field of Search .................... 62/63, 374, 380, 57

[56] References Cited

U.S. PATENT DOCUMENTS

| | | | |
|---|---|---|---|
| 3,228,838 | 1/1966 | Rinfret | 62/78 |
| 3,498,070 | 3/1970 | Allen et al. | 62/64 |
| 3,558,105 | 1/1971 | Moritz | 62/374 |
| 3,611,737 | 10/1971 | Alaburda et al. | 62/374 |
| 3,611,745 | 10/1971 | Schlemmer | 62/333 |
| 3,889,488 | 6/1975 | Maeda et al. | 62/374 |
| 4,186,566 | 2/1980 | AuYoung | 62/380 |
| 4,186,797 | 2/1980 | Guttinger et al. | 62/380 |
| 4,377,937 | 3/1983 | Alquier et al. | 62/374 |
| 4,655,047 | 4/1987 | Temple et al. | 62/64 |
| 4,843,840 | 7/1989 | Gibson | 62/375 |

FOREIGN PATENT DOCUMENTS

| | | |
|---|---|---|
| 1076243 | 10/1954 | France . |
| 2212521 | 7/1974 | France . |
| 1241320 | 8/1971 | United Kingdom . |
| 1344513 | 1/1974 | United Kingdom . |
| 9006693 | 6/1990 | World Int. Prop. O. . |

*Primary Examiner*—Ronald C. Capossela
*Attorney, Agent, or Firm*—Browdy and Neimark

[57] ABSTRACT

Process for freezing a product in which said product is contacted with a film made of a liquefied gas of which the boiling point is below −30° C., disposed at the surface of a vibrating support, and the frozen product is at least in part separated from said film of liquefied gas.

Device for freezing a product including a vibration generator (7) connected to a support (2) at the surface of which there is disposed a film of liquefied gas (3) of which the boiling point is below −30° C.

16 Claims, 1 Drawing Sheet

FREEZING PROCESS AND APPARATUS

The present invention concerns a process and an apparatus for freezing a product, for example a food product, in order to freeze at least one of its surfaces.

The freezing of food products is normally carried out in freezing tunnels where the cold is obtained by mechanical means.

These food products which are intended to be frozen are often sticky and adhere to the moving carpets of the freezing tunnel on which they are conveyed, thus causing a problem of maintenance and hygiene.

Moreover, these products may not be too compact and they easily fall into pieces, thus losing the shape intended therefore, during their handling. This is the case, for example, of balls of vegetable purée, which are extremely difficult to handle.

Processes for freezing food products have already been proposed, according to which the products to be frozen are placed on a metallic support of which the temperature has previously been lowered so that only the surface of the products in contact with the metallic support is frozen. The temperature of the support may for example be lowered by means of a cryogenic gas which circulates in a trough placed below said support. Depending on the nature of the support and its heat conductivity, temperatures of the order of $-60°$ C. to $-90°$ C. may be reached.

However, it has been observed that these processes could have disadvantages, in particular when treating products which are particularly sticky, such as balls of vegetable purée.

According to these processes, these balls adhere to the wall until their surface could be sufficiently cooled down, thus resulting in a period of latency which delays the treatment of products upstream of the production line.

Such a period of latency may then lead to a substantial decrease of productivity.

The process according to the present invention enables to prevent the adhesion of the products to be frozen on the support, even when they are very sticky, thereby permitting a substantially improved productivity and a great facility of maintenance.

Moreover, according to such a process, the nature of the support has little importance, in particular the support does not have to be made of a material which has a good heat conductivity.

According to another aspect of the process of the invention, the means used may easily be adapted to any type of products to be frozen, by relying on simple adjustments.

The present invention therefore concerns a process for freezing a product, for example a food product, characterized in that said product is contacted with a film made of a liquefied gas of which the boiling point is below $-30°$ C., which is disposed at the surface of a horizontal or downwardly sloping vibrating support, and the product at least partially frozen is separated from said film of liquefied gas.

Surprisingly, it has been observed that even very sticky products, do not adhere to the support, in spite of the fact that the film may be very thin.

Without being bound to a theoretical explanation, it is believed that the treated product floats at the surface of the film of liquefied gas through a phenomenon of calefaction, thereby preventing any risk of adhesion on the support. Moreover, the direct contact between the product and the film of liquefied gas whose temperature may be very low, enables a nearly immediate freezing of the surfaces of the product in contact with the film of liquefied gas.

Within the scope of the invention, the products to be frozen are essentially food products which can be in solid state, in particular slices of fish or meat, minced or not minced, cakes, pizzas, whole or cut vegetables, which can be in a pasty state, such as balls of vegetable purée. These products may be possibly in semi-liquid or even liquid state.

Besides food products, it is also possible to treat industrial products such as fatty materials or waxes whose melting points are near room temperature. The process according to the invention is particularly suitable for the treatment of solid or pasty products which are in final shape and for which the lower surface in direct contact with the film of liquefied gas is intended to be frozen. These products generally have a surface in contact with the film in which the longest diagonal line has a length higher than 1 cm, more often higher than 3 cm. Their thickness is normally higher than 0,5 cm and more generally between 1 and 20 cm.

The film of liquefied gas is generally made of a non-toxic gas of which the boiling point is advantageously lower than $-150°$ C. Preferably said liquefied gas consists of liquid nitrogen.

Normally, the thickness of the film of liquefied gas is, as an average, lower than 10 mm, and preferably is between 2 and 5 mm. In a particularly advantageous manner, the film of liquefied gas is movable at the surface of the support. The speed at which it flows is generally lower than 1,5 m/s and preferably between 0,1 and 1 m/s. The thickness of the film as well as its speed are essentially controlled by the flow of liquefied gas feeding the support, and when the support is downwardly sloping, it is controlled by the degree of inclination of the slope. The man of the art is perfectly in the position to adjust said flow and, possibly, said slope, so as to obtain the desired thickness and speed. When the support is downwardly sloping, the latter is preferably lower than 10 cm/m, generally between 1 and 5 cm/m. The support on which the film of liquefied gas is mounted has a vibratory movement of which the frequency varies depending on the speed that the treated product should have and therefore the desired time of contact between said product and said film.

Generally, this frequency is of the order of 5 to 100 Hertz, more generally of the order of 7 to 60 Hertz.

The amplitude of the vibratory movement may be such that the acceleration of the support is comprised between 20 and 100 m/s². This amplitude is generally comprised between 0,2 and 20 mm, preferably between 0,3 and 15 mm.

The time of contact between the film of liquefied gas and the product may also be adjusted as a function of the angle between the direction of the vibratory movement and the plane of the support, which is generally between 15 and 60 degrees. This time of contact may also be adjusted depending on the length of the support, normally between 1 and 3 m and, possibly, on its slope. Generally, the procedure is such that the time of contact between the product being frozen and the film of liquefied gas is lower than 30 seconds, preferably lower than 15 seconds.

At the end of an operation according to the process of the invention, the products in which at least one of the surfaces has been frozen, is recovered by any means and possibly they are frozen entirely, for example by means of a device producing mechanical cold such as a known freezing tunnel.

The present invention also concerns a device for freezing products for example food products according to the process described above characterized in that it comprises a vibration generator connected to a support at the surface of which there is provided a film of liquefied gas of which the boiling point is below −30° C., preferably below −150° C. The support may be of any shape suitable for keeping said film at its surface. In particular, it may be a simple trough.

The material of which this support is made is not critical, as long as this material may be resistant against low temperatures and vibrations. Thus, this material may be a metal or an alloy, such as for example, aluminum or steel, but it may also be a composite material or a ceramic material. The support may be insulated by means of an insulating material such as a foam, for example a polyurethane foam.

The vibration generator may for example be a system of springs, cranks or flexible blades.

After separation of the product in which at least one of the surfaces has been frozen, the liquefied gas constituting the film may be recycled by any adequate means, for example by means of a pump.

The device according to the invention may also include a suction hood to eliminate the vapors of liquefied gas. Such a hood may for example be disposed at the location where the film of liquefied gas and the frozen product are separated.

The invention is now described more in detail with reference to FIGS. 1 and 2.

Figure 1:
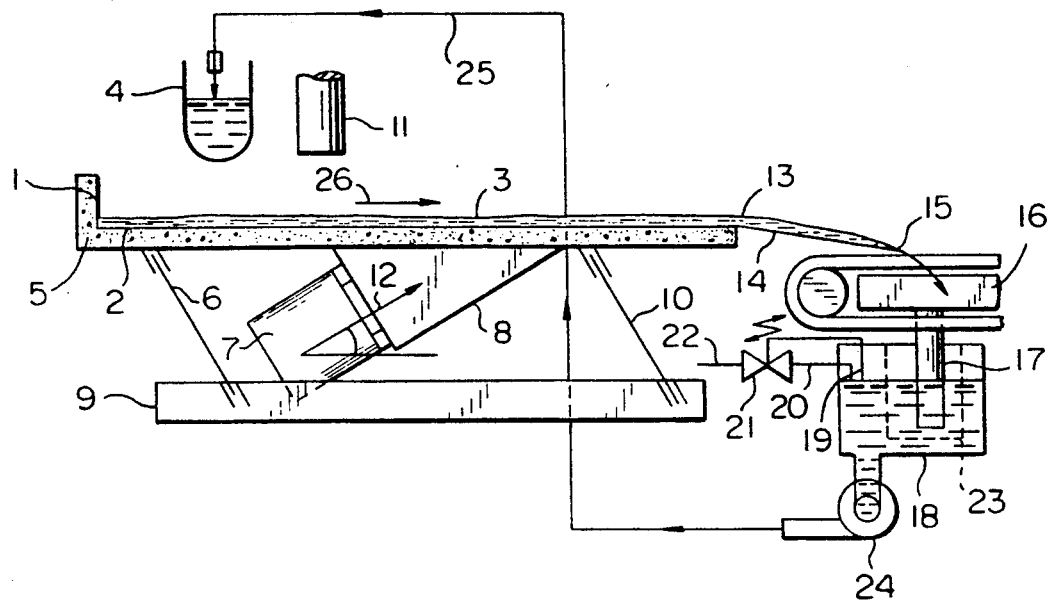
FIG. 1 represents a device in which the horizontal support is connected to the carpet of a known freezing tunnel.
Figure 2:
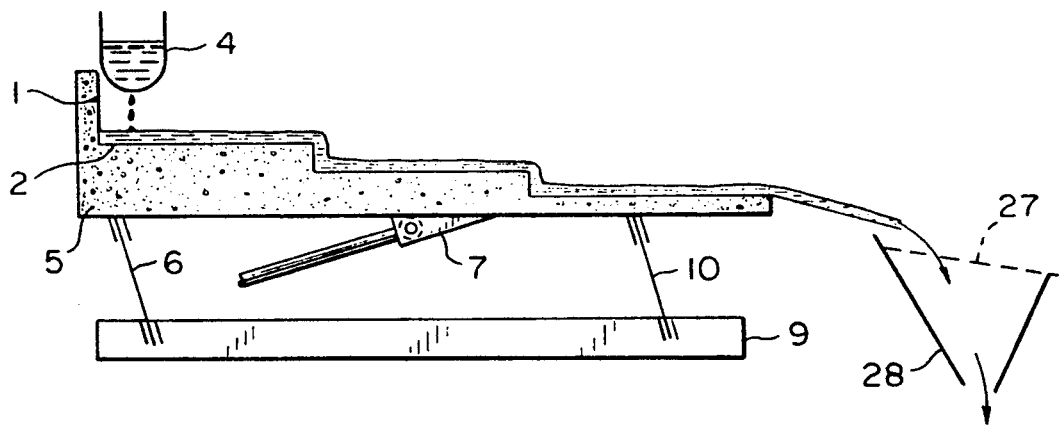
FIG. 2 represents a device according to the invention in which the support is arranged in steps.

FIG. 1 represents a device according to the invention including a trough 1 which is insulated by means of an insulating foam 5 of which the bottom constitutes a horizontal support 2, on the surface of which circulates a film of liquid nitrogen 3, supplied with liquid nitrogen by means of a trough 4 perforated at its lower end and disposed above the upstream end of the support 2.

Support 2 is connected through its lower face to a system of suspensions 6 and 10 and to a vibration generator 7 by means of support member 8. The suspension system 6 and 10 and the vibration generator 7 are fixedly mounted on a stand 9. The products to be frozen, for example balls of vegetable purée, are deposited on the surface of the support 2 by means of a duct 11 which terminates a chain of preparation and of shaping (not illustrated).

The bottom of the trough 1 defining the support 2 extends at its downstream end 13 in a plate 14 which opens at the inlet of a perforated moving carpet 15, enabling to lead the treated products according to the invention towards a freezing tunnel (not illustrated) for their complete freezing.

Under the moving carpet 15 there is provided a receiving enclosure 16, connected by means of a discharged duct 17 to a vat 18 for the recovery of liquid nitrogen. Vat 18 is provided with a level detector 19 and a duct 20 provided with an electrovalve 21 controlled by level detector 19. The electrovalve 21 is connected by means of a duct 22 to a source of liquid nitrogen (not illustrated). The discharge duct 17 is provided at its lower end with a filter 23. Vat 18 is also provided with a pump 24, connected by means of a duct 25 to trough 4.

The device described above may be operated as follows: the products to be treated fall from duct 11 on the movable film of liquid nitrogen 3.

The vibratory movement, of which the direction is indicated by arrow 12, produced by the vibration generator 7, gives to the treated products a selected acceleration, enabling them to move at the surface of support 2 in the direction of arrow 26. The products of which the surface in contact with the film has been frozen, are received by plate 14, conveyed towards the moving carpet 15 and are lead into a freezing tunnel in order to freeze them completely.

The film of liquid nitrogen which is received at the downstream end 13 of the support 2, after passing on plate 14, flows through the perforations of the moving carpet 15 in the receiving enclosure 16. After passing in flow duct 17, and through filter 23, the liquid nitrogen is recovered in vat 18. Pump 24 enables the recycling of liquid nitrogen which passes through the duct 25 and which is received by trough 4. The flow of liquid nitrogen from through 4 onto support 2, is selected so as to give to the film of liquid nitrogen, a predetermined thickness and speed. The losses of liquid nitrogen due to evaporation are compensated by the addition of complementary liquid nitrogen in vat 18.

FIG. 3 represents a variant of the device according to the invention where the bottom of the trough 1 defining the support 2 is multi-stepped so as to enable the products to be treated to turn over and thus to freeze at a plurality of their surfaces. The recovery of frozen products may for example be carried out by means of an inclined grid 27 disposed on a funnel 28. The liquid nitrogen may be recycled in the manner described above in order to feed the film of liquid nitrogen.

The examples which follow illustrate the present invention:

EXAMPLE 1

For the freezing of cubes of chicken having 20 mm edge, a device as illustrated in FIG. 1 is used. The length of support 2 is 1,2 m and its width is 0,21 m. Support 2 is provided with a vibratory movement whose amplitude is 3 mm and where the frequency is 25 Hertz. The flow of liquid nitrogen received by trough 4 is 100 l/h, so that the speed of flow of the film of liquid nitrogen at the surface of the support is 0,3 m/s and its average thickness is 5 mm.

The cubes of chicken falling in duct 11 on the film of liquid nitrogen have a temperature of 10° C. The time of contact of the cubes of chicken with the film of nitrogen is 9 seconds, after which, said cubes have a temperature of −2° C.

It was thus possible to freeze the lower surface of 160 kg of cubes of chicken/h.

EXAMPLE 2

In order to freeze stems of spinach in the form of parallelepiped measuring 60 ×60 ×20 mm and having a unitary weight of 100 g, the same device as that of example 1 is used, the support 2 having this time a length of 3 m and a width of 0,6 m. The spinachs which fall from duct 11 have a temperature of 15° C. The time of contact with the film of liquid nitrogen is about 25 seconds, after which the parallelepipeds are recovered and have a temperature of −3,5° C.

It was thus possible to treat 800 kg/h of stems of spinach in the form of parallelepiped, whose lower surface was frozen.

The spinaches do not adhere to the surface of the support 2 and, after recovery, they may easily be handled for complete freezing in a freezing tunnel.

I claim:

1. A process for freezing products, comprising:
   providing a transfer structure having at least one upper elongated transfer surface and having a discharge end and an opposite end, the discharge end being at a level not higher than the opposite end;
   forming a film of liquefied gas on the transfer surface;
   imparting vibration to the transfer structure;
   positioning products on the transfer surface adjacent the opposite end so as to contact a surface portion of the products with the film of liquefied gas;
   moving the products along the transfer surface towards the discharge end as a result of the vibration imparted to the transfer structure while partially freezing the products; and
   collecting the thus partially frozen products at the discharge end for further processing.

2. The process of claim 1, wherein the liquefied gas is dispensed on the opposite end of the transfer surface.

3. The process of claim 2, wherein the film of liquefied gas is circulated along the transfer surface and liquefied gas is collected at the discharge end for recirculation.

4. The process of claim 3, wherein the flow rate of the liquefied gas circulating on the transfer surface is less than 1.5 m/s.

5. The process of claim 1, wherein the liquefied gas has a boiling point not exceeding −150° C.

6. The process of claim 5, wherein the film or liquefied gas has a thickness not exceeding 10 mm.

7. The process of claim 6, wherein the film of liquefied gas has a thickness between 2 and 5 mm.

8. The process of claim 1, wherein the transfer structure is vibrated at a frequency between 5 and 100 Hz.

9. A process for freezing a sticky food product, comprising:
   providing a substantially impervious, elongated support surface having an infeed location and a discharge location, said support surface being substantially planar and being horizontally disposed or downwardly sloping from said infeed location to said discharge location;
   forming a thin film of liquefied gas on said substantially planar and impervious support surface;
   feeding sticky food product to said support surface at said infeed location so as to contact said sticky food product with said film of liquefied gas;
   at least partially freezing said sticky food product while moving said product along said support surface toward the discharge location while imparting vibration to said support surface; and
   discharging the resultant frozen food product from said support surface at said discharge location.

10. The process according to claim 9 wherein said sticky food product comprises a purée.

11. An apparatus for freezing products, comprising:
    a transfer structure having at least one upper surface and having a discharge end and an opposite end, the discharge end at an horizontal level being not higher than the opposite end;
    vibrating means coupled to the transfer structure for causing said transfer structure to vibrate;
    dispensing means for dispensing freezing liquefied gas onto the transfer surface at the opposite end so as to form a film of liquefied gas onto the upper surface;
    means for chuting products to be frozen onto the transfer surface intermediate the liquefied gas dropping means and the discharge end; and
    means for collecting liquefied gas at the discharge end.

12. The apparatus of claim 11, further comprising means for recirculating liquefied gas collected at the discharge end towards the dispensing means.

13. The apparatus of claim 12, wherein the upper surface is horizontal.

14. The apparatus of claim 12, wherein the transfer structure is formed with at least two successive transfer surfaces, the downstream transfer surface at a lower level than the adjacent upstream transfer surface.

15. The apparatus of claim 12, wherein the transfer structure is at least part made of a heat insulating material.

16. The apparatus of claim 12, wherein the liquefied gas is nitrogen.

* * * * *